G. P. REED.
Velocipede.

No. 90,782. Patented June 1, 1869.

WITNESSES
Edmund H. Hewins
Geo. A. Loring

INVENTOR
George P. Reed
by his Attorney
Frederick Curtis

United States Patent Office.

GEORGE P. REED, OF BOSTON, MASSACHUSETTS.

Letters Patent No. 90,782, dated June 1, 1869.

IMPROVED VELOCIPEDE.

The Schedule referred to in these Letters Patent and making part of the same.

*To all to whom these presents shall come:*

Be it known that I, GEORGE P. REED, of Boston, in the county of Suffolk, and Commonwealth of Massachusetts, have made an invention of certain new and useful Improvements in Velocipedes; and do hereby declare the following to be a full, clear, and exact description thereof, due reference being had to the accompanying drawings, making part of this specification, and in which—

Figure 1:
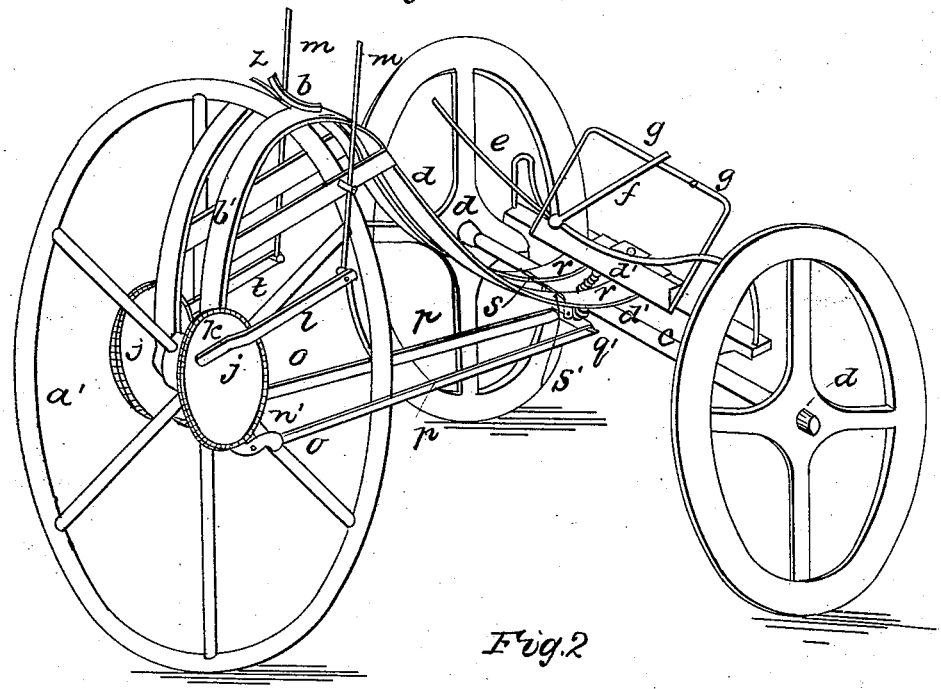
Figure 2:
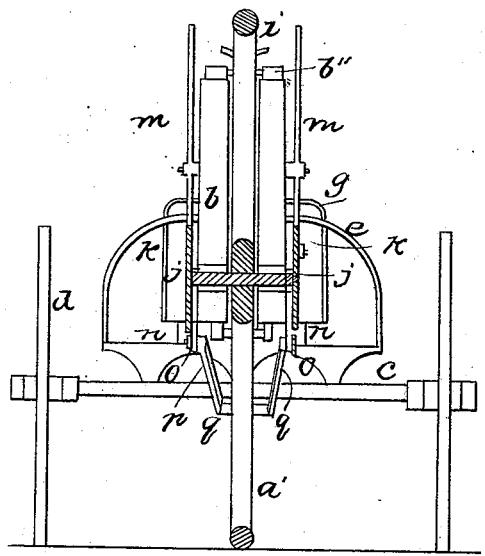

-Figure 1 is a perspective representation of a velocipede, embodying my invention or improvements;

Figure 2 being a vertical and transverse section of the same, taken through the axis of the rear or propelling-wheel of the vehicle.

This invention has for its basis a three-wheeled velocipede, or "tricycle," so called; the object had in view, in making the invention, being rather to produce a means of exercising and developing the various muscles of the human body in the open air, and to impart vigor and strength thereto, than for the purposes of indoor amusement and exhibitions of speed and dexterity, to which uses the two-wheeled velocipede is now generally devoted.

The general characteristics of a vehicle, which I have adopted in carrying out my present invention, will be found to consist of two wheels, mounted upon an axle at the front of the carriage, or of the furcated perch constituting the seat-supporting body of the carriage, and revolving independently of each other thereupon, the axle being swivelled at its centre to the perch, by which means its wheels become the steering-wheels of the vehicle; of a single and superior wheel, mounted at the rear of the vehicle, and upon the axis of which the power is applied to propel the vehicle over the surface of the ground; of a means for securely confining the steering-wheel in position when the vehicle is driven in a right line, and of enabling such vehicle to be steered by the action of the knees of the rider, or of his hands, at pleasure; of a means of enabling a velocipede to be propelled by the combined exertion of the hands and feet, or of either individually, or of either opposite hand and foot together; and, lastly, in the peculiar disposition and arrangement of a brake, with respect to the driver's seat, the driving-wheel, and the propelling-devices of the vehicle, whereby its progress may be retarded or arrested at the will of the rider, the whole being arranged and operating as hereinafter explained.

The drawings above mentioned as accompanying this specification, represent a velocipede embodying my invention, the main condition of which consists in a novel and useful arrangement of the above-mentioned elements.

In such drawings—

$a$ denotes the curved and furcated perch, in its general outline being similar to the corresponding part of a two-wheeled vehicle, in which the crest of the perch is disposed at the forward part of the vehicle, while in my carriage the crest is at the rear thereof, and supports the driver's seat, which, in the drawings, is shown at $b$.

The forward extremity of the perch $a$ is swivelled to the front axle $c$, the wheels of such axle being shown at $d$ $d$, as applied thereto, independently of each other, in order to enable the vehicle to describe a circle of small radius with ease and celerity, which it is well known would not be the case were the two wheels fixed to and revolving with each other.

The lateral motions of the steering-wheel axle, and consequently the direction of the vehicle, are guided and controlled by a curved rod, $e$, preferably formed with a forked extremity, to obtain bearing-surface upon the axle, the upper end of the rod being extended to such a position, with respect to the driver's seat, as to enable it to be readily grasped by his hand, or to be enclosed between his knees, by either of which means it may be readily guided.

The steering-rod $e$ is provided with a projecting horn, $f$, to rest upon the upper surface of a horizontal support or open dasher, $g$, rising from the forward extremity of the perch and over the steering-axle, the horn being of such material and sufficiently flexible to press upon the support with considerable power, the latter being provided with one or more notches, $g'$, for securing the horn and retaining it securely in place while the vehicle is traversing a considerable distance in a straight line, but which allows it to be readily removed therefrom by the power of the rider's hand.

The rear and driving-wheel of the carriage is shown at $a'$, as situated at the rear part of the perch and within its fork, the axis of the wheel being supported in proper bearings, formed upon the rear extremity of the perch, which is given a downward bend, $b'$, for the purpose.

The brake of the vehicle is represented at $i$, in the accompanying drawings, as composed simply of a short lever, pivoted to the rear side of the driver's seat, and with its lower end lying loosely in immediate proximity to the periphery of the driving-wheel.

By placing his hand behind his back and seizing the upper extremity of the lever $i$, and drawing it toward him, the rider may exert friction upon the wheel, sufficient to retard or to entirely stop the motion of such wheel.

$j$ $j$ in the drawings denote two ratchet-wheels, one fixed to each extremity of the axis of the driving-wheel and outside of the perch.

To the outer face of each ratchet-wheel, a crank wrist-pin, $k$ or $k'$, is affixed, to which one end of a horizontal connecting-rod, $l$ or $l'$, is pivoted; the opposite extremity of such rod being in turn pivoted to the lower end of an upright lever, $m$ or $m'$, such levers being fulcrumed at about their centres to opposite sides of the perch, and being of such length and disposition that their upper extremities or handles shall be in a convenient position with respect to the driver's hands, in order that he may readily grasp one or both of them, as occasion requires, to aid in propelling the vehicle.

In addition to the cranks applied to the ratchet-wheels, I have combined with each of them, as an additional means of propelling the vehicle, a pawl, $n$, or $n'$, such pawl being fulcrumed to an arm, $o$ or $o'$, projecting beyond the perimeter of the wheel, and taking into its teeth, the longer end of the pawl being pivoted to one end of a long pitman, $p$ or $p'$, the opposite extremity of such pitman being swivelled to the lower end of a vibrating lever or treadle, $q$ or $q'$, which in turn is fulcrumed at or near its centre to a support, $r$ or $r'$, depending from the lower side of the perch of the vehicle, and immediately in rear of its forward axle, the upper ends or foot-rests, $s$ or $s'$, of the said lever, rising above the perch and into a convenient position to receive the feet of the rider, it being of course apparent that alternating reciprocations of the pitman will produce partial revolutions of the ratchet and of the driving-wheels.

The employment of the ratchet enables me to overcome the disadvantages of stopping the vehicle on the dead-point of the ordinary crank, and allows it to be instantly put in motion, in whatever position it may have been stopped, whether on a hill or on a plain.

I would remark that it will be evident to mechanics that the adaptation of the ratchets and hand-levers may be transposed, that is, the ratchets may be connected with the hand-levers, and the cranks with the foot-treadles.

When not in actual use, the treadles $q$ or $q'$ are to be forced into such a position as to cause their foot-rests to lie flat upon the upper surface of the perch.

In this position they are not in the way of the rider's feet when he is propelling the vehicle with his hands, and gives him ample opportunity to brace his feet against the lower part of the dasher or foot-board $g$, by which means he is enabled to exert the full power of his hands and body to the best possible advantage.

In order to retract the pitman $p\ p'$, after actuating the ratchet-wheels, each should be provided with a spring, $d'$ or $d''$, or equivalent for such springs.

The above description embraces the mechanical construction of a velocipede, in which my invention is contained.

It will be apparent to the intelligent reader that the driver of such vehicle may propel it, if desirable, by the application of power of one foot, while the other may be braced against the dasher, his hands being free from service or employed to steer the course of the vehicle; or he may employ both his feet at once to propel the vehicle.

Again, he may employ either or both hands for the purpose, or either of his hands combined with either one of his feet; or, still further, he may apply the full power of his hands and feet together simultaneously, by this means gaining great power of propulsion.

Should the rider propel the vehicle with his hands, his feet may both be forced against the dasher with great ease and comfort to himself.

It is believed that the above-described velocipede will be considered a valuable acquisition for healthy exercise and developing any particular muscle or set of muscles throughout nearly the entire body, to any extent, and, while driving the vehicle with one member, to relieve the other.

The form of the perch of my vehicle, and its arrangement with respect to the forward wheels, enable a person to seat himself quickly and easily, and in this respect my invention will recommend itself to ladies.

A valuable adaptation of my invention will be found in its use for cripples who may have lost one or more limbs.

Claim.

I claim a velocipede containing the characteristics, arranged as before described, that is to say, the combination and arrangement of the swivelled axle $c$, provided with its independent wheels, $d\ d$, and steering-rod $e$, the perch $a$, with its dasher or foot-rest $g$, driver's seat $b$, and brake $i$, and the driving-wheel, provided with the ratchet-wheels $j\ j$, and their cranks and pawls, or equivalents, and connected with the hand-levers $m\ m'$, and foot-treadles $s\ s'$, the whole being substantially as before described.

GEO. P. REED.

Witnesses:
 FRED. CURTIS,
 E. GRIFFITH.